(12) United States Patent
Wang et al.

(10) Patent No.: US 8,816,627 B2
(45) Date of Patent: Aug. 26, 2014

(54) ENERGY EFFICIENT MOTION CONTROL SYSTEM

(75) Inventors: Yebin Wang, Acton, MA (US); Koichiro Ueda, Tokyo (JP); Scott A. Bortoff, Brookline, MA (US)

(73) Assignees: Mitsubishi Electric Research Laboratories, Inc., Cambridge, MA (US); Mitsubishi Electric Corporation, Chiyoda-ku, Tokyo (JP)

( * ) Notice: Subject to any disclaimer, the term of this patent is extended or adjusted under 35 U.S.C. 154(b) by 392 days.

(21) Appl. No.: 13/294,049

(22) Filed: Nov. 10, 2011

(65) Prior Publication Data

US 2013/0119916 A1    May 16, 2013

(51) Int. Cl.
*H02P 31/00* (2006.01)
*G05B 19/31* (2006.01)

(52) U.S. Cl.
USPC .......................... 318/565; 631/492; 631/558

(58) Field of Classification Search
CPC ........ G05B 13/04; G05B 19/19; G05B 19/31; H02P 21/0042; H02P 21/141; H02P 21/146; H02P 6/205; H02P 6/001; Y02T 10/7258; Y02T 10/7275; Y02T 10/7283; B60L 2220/14; B60L 2220/16; H02K 11/0073
USPC .......................... 318/565, 671, 490, 492, 558
See application file for complete search history.

(56) References Cited

U.S. PATENT DOCUMENTS

| | | | | |
|---|---|---|---|---|
| 5,301,101 A | * | 4/1994 | MacArthur et al. | 700/36 |
| 6,847,854 B2 | * | 1/2005 | Discenzo | 700/99 |
| 7,606,624 B2 | * | 10/2009 | Cullen | 700/29 |
| 7,701,156 B2 | * | 4/2010 | Okamura | 318/255 |
| 8,489,262 B2 | * | 7/2013 | Yamasaki | 701/19 |
| 8,525,468 B2 | * | 9/2013 | Winterhalter et al. | 318/798 |

FOREIGN PATENT DOCUMENTS

WO   02/074501   9/2002

OTHER PUBLICATIONS

Nilsson & Riedel, "Electric Circuit", fifth edition, Addison-Wesley Publishing Company, New York, 1996. ISBN 0-201-55707-x. pp. 4 and 5, under "Circuit Theory", it defines the "model" as an electric circuit.*

* cited by examiner

*Primary Examiner* — Bentsu Ro
(74) *Attorney, Agent, or Firm* — Dirk Brinkman; Gene Vinokur

(57) ABSTRACT

A control signal for controlling an operation of a motion control system suitable for positioning a load is generated using determining a cost function based on a model of energy consumption of the system and a function of a tracking time; and minimizing the cost function subject to constraints to determine a trajectory of the control signal. The control signal is generated based on the trajectory and a current state of the system, wherein the steps of the method are performed by a processor.

16 Claims, 13 Drawing Sheets

100

200

300

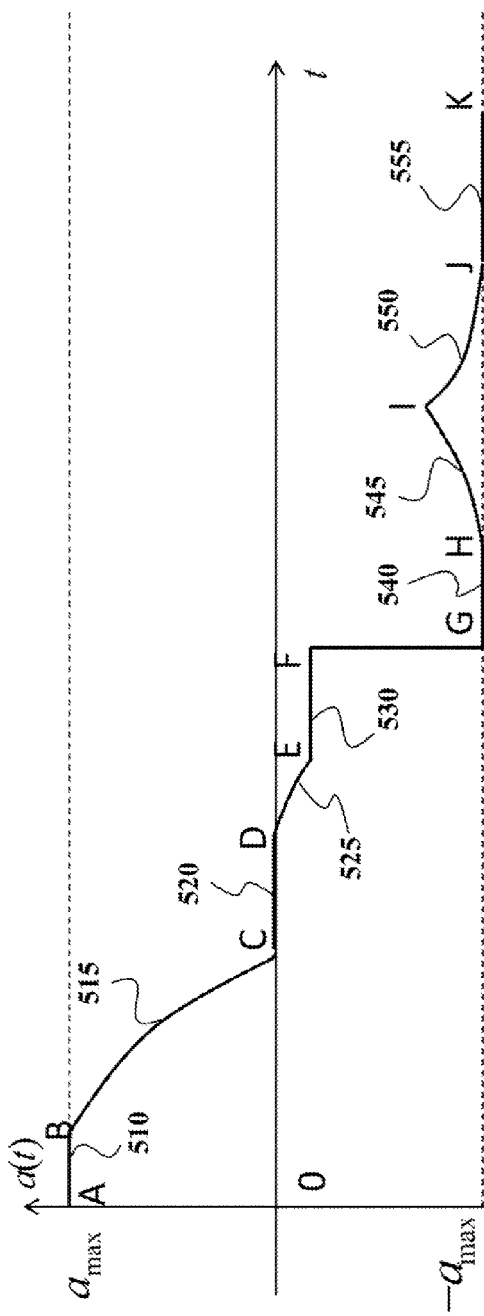
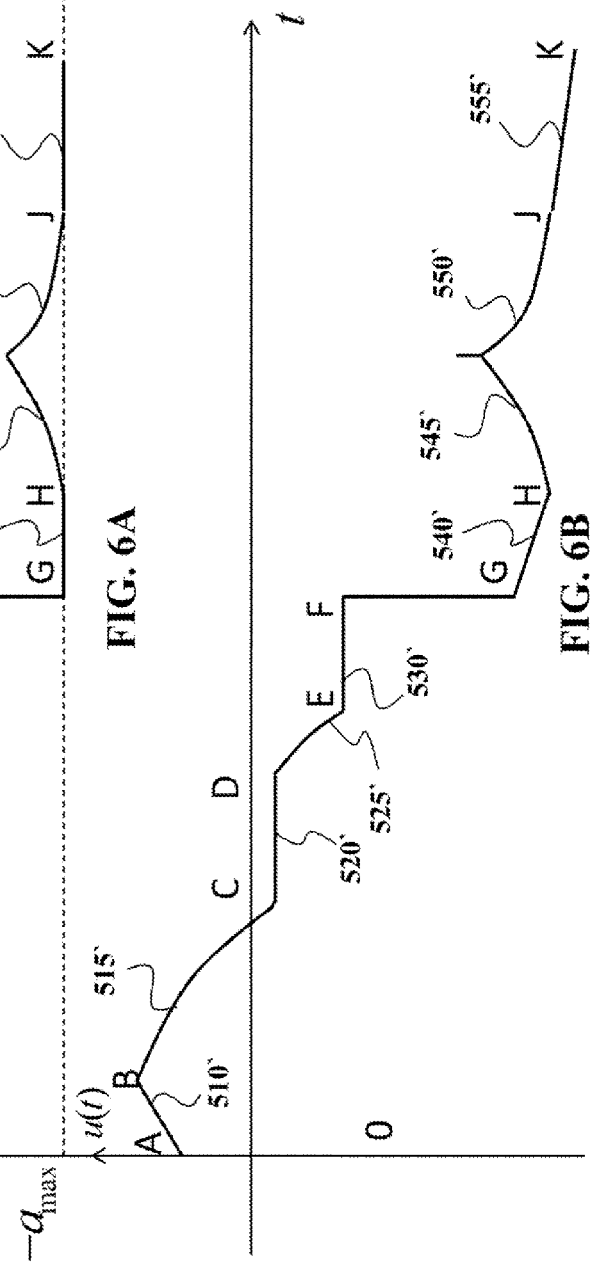

900

ENERGY EFFICIENT MOTION CONTROL SYSTEM

FIELD OF THE INVENTION

This invention relates generally to a motion control system, and more particularly to an energy efficient motion control system.

BACKGROUND OF THE INVENTION

A motion control system is used in different positioning applications, e.g. single-axis positioning or multiple-axis positioning. A single-axis positioning motion control system includes a motion controller, a servo amplifier, and a motor. Motion of the motor follows a designated trajectory, such that state and/or control constraints, i.e., acceleration, velocity, jerk, are observed. A trajectory can also be designed to reduce the vibration induced by the motion of a motor.

A conventional motion control system employs a controller which generates a time-optimal trajectory to maximize the throughput of industrial systems. However, some conventional methods for generating the trajectories disregard the energy consumption of the motion control system, and can lead to a high peak power and a waste of energy. The waste of energy is clearly undesirable and should be avoided. Also, the high peak power demand is also undesirable from a cost effective point of view, because users of the motion control systems may have to pay penalized electric bill when the power consumption exceeds certain upper bound.

Another method determines the trajectory such that the energy consumption of the motion control system is below a specified threshold. However, those methods do not consider trade off between the energy consumption and performance of the system and the generated trajectories are not always optimal. Yet another method balances the energy consumption and the productivity of the motion control system without considering constraints of the system. This is because the solution to the trajectory optimization problem with various constraints including velocity, acceleration, and current constraints is difficult and yet to be solved.

Another disadvantage of conventional motion control systems is a lack of adaptability, because the requirements of the motion control systems can change over time and/or in dependence of the applications. For example, for some applications, the users may pay more attention to the energy consumption of the motion control system over its productivity.

Accordingly, there is a need to provide a motion control system that makes an effective trade off between the energy consumption and the productivity of the motion control system, such that the overall cost of the operations of the motion control system is reduced. Furthermore, there is a need to provide such trade off that considers various constraints of the motion control system including velocity, acceleration, and current constraints.

SUMMARY OF THE INVENTION

It is an object of the invention to provide an energy efficient motion control system.

It is further object of the invention to provide a method that makes an effective trade off between the energy consumption and tracking time of an operation of the motion control system.

It is further object of the invention to provide such trade off that considers various constraints of the motion control system including velocity, acceleration, and current constraints.

It is further object of the invention to provide a method for generating energy efficient trajectory of a motion of a motor of the motion control system.

A motion control system includes one or combination of a motion controller, an amplifier, and a motor. The trajectory of the motion of the motor has a key role in the motion control system. Embodiments of the invention disclose an energy-efficient motion control system and methods to generate an energy-efficient trajectory of the motion of the motor of the motion control system to reduce the energy consumption of the entire motion control system. In some embodiments, an energy efficient trajectory is generated by solving a constrained nonlinear optimization problem with dynamic, acceleration, control, and velocity constraints.

Some embodiments of the invention are based on a realization that a model of energy consumption of the motion control system can be determined. A cost function, which is a function of a tracking time, is determined based on that model and can be minimized subject to constraints to produce the energy-efficient trajectory of the motion of the motor of the motion control system.

Accordingly, one embodiment discloses a method for generating a control signal for controlling an operation of a motion control system suitable for positioning a load. The method includes determining a cost function based on a model of energy consumption of the system and a function of a tracking time; minimizing the cost function subject to constraints to determine a trajectory of the control signal; and generating the control signal based on the trajectory and a current state of the system, wherein the steps of the method are performed by a processor.

In some variations of this embodiment; the model is determined based on the energy consumption of components of the system. For example, the model may be determined based on at least one of a copper loss at a motor of the system, an iron loss at the motor of the system, a switching loss of an amplifier of the system, and a mechanical work required for positioning the load, or combination thereof. Also, in some embodiments, the constraints includes one or combination of an acceleration constraint of a motor, a velocity constraint of the motor, an input current constraint of the motor, a dynamic constraint of the motor, the tracking time, an initial state of the motor, and a final state of the motor.

The method may also include determining a Hamiltonian based on the cost function and the constraints; determining a set of conditions minimizing the Hamiltonian; and determining the trajectory that satisfies the set of conditions. The method may also include formulating a resultant multi-point boundary value problem based on the set of conditions; and solving the problem to produce the trajectory.

Additionally or alternatively, the method may also include defining a Hamiltonian based on the cost function and the constraints, wherein the Hamiltonian includes a first Hamiltonian for a positive control signal and a positive energy consumption, a second Hamiltonian for a negative control signal and the positive energy consumption, and a third Hamiltonian for the negative control signal and the negative energy consumption; determining a first set of conditions for a first sub-trajectory, such that the first Hamiltonian is minimized; determining a second set of conditions for a second sub-trajectory, such that the second Hamiltonian is minimized; determining a third set of conditions for a third sub-trajectory, such that the third Hamiltonian is minimized; and determining the set of conditions based on the first, the second, and the third set of conditions.

Additionally or alternatively, the method may also include determining nonlinear algebraic equations (NAE) satisfying the set of conditions, such that the NAE defines the control signal at a current point of the tracking time; determining boundary conditions, wherein the boundary conditions include terminal conditions, and entry conditions for each of the first, the second, and the third sub-trajectory; determining nonlinear ordinary differential equations (ODE) satisfying the boundary conditions, such that the ODE defines a state and a costate of the system at the current point of the tracking time; and solving the ODE and the NAE alternately over the tracking time until the boundary conditions are satisfied to produce the trajectory. The NAE may include linear algebraic equations.

In some variations of the embodiment, the method may include determining a preliminary trajectory; and selecting the preliminary trajectory as the trajectory, if a gradient of the cost function with respect to the preliminary trajectory is less than a threshold. The method may also include determining a finite dimensional optimization problem that minimizes the cost function subject to the constraint; and determining the trajectory by solving the problem.

Additionally or alternatively, the method may also include performing a discretization of decision variables, the cost function, and the constraints; approximating an infinite dimensional optimization problem with the finite dimensional optimization problem; generating a preliminary trajectory; determining a gradient of the cost function with respect to the preliminary trajectory; determining the trajectory based on the preliminary trajectory, if the gradient is less than a threshold; and otherwise updating the preliminary trajectory based on the gradient and the constraints; and repeating the determining the gradient and the determining the trajectory.

Another embodiment discloses a motion control system, which includes a motor configured to be controlled based on a control signal; a processor configured to execute a trajectory generation module and a control module, wherein the trajectory generation module determines a trajectory of the control signal based an energy model, such that the trajectory optimizes the energy consumption as a function of a tracking time of the system, wherein the energy model is a model of energy consumption of the system, and the control module generates the control signal based on a current state of the system and the trajectory; and an amplifier for generating a control input to the motor based on the control signal.

BRIEF DESCRIPTION OF THE DRAWINGS

FIGS. 6A-6B are graphs illustrating types of various structures of the trajectory according to some embodiments of the invention;

DETAILED DESCRIPTION OF THE PREFERRED EMBODIMENT

Figure 1A:
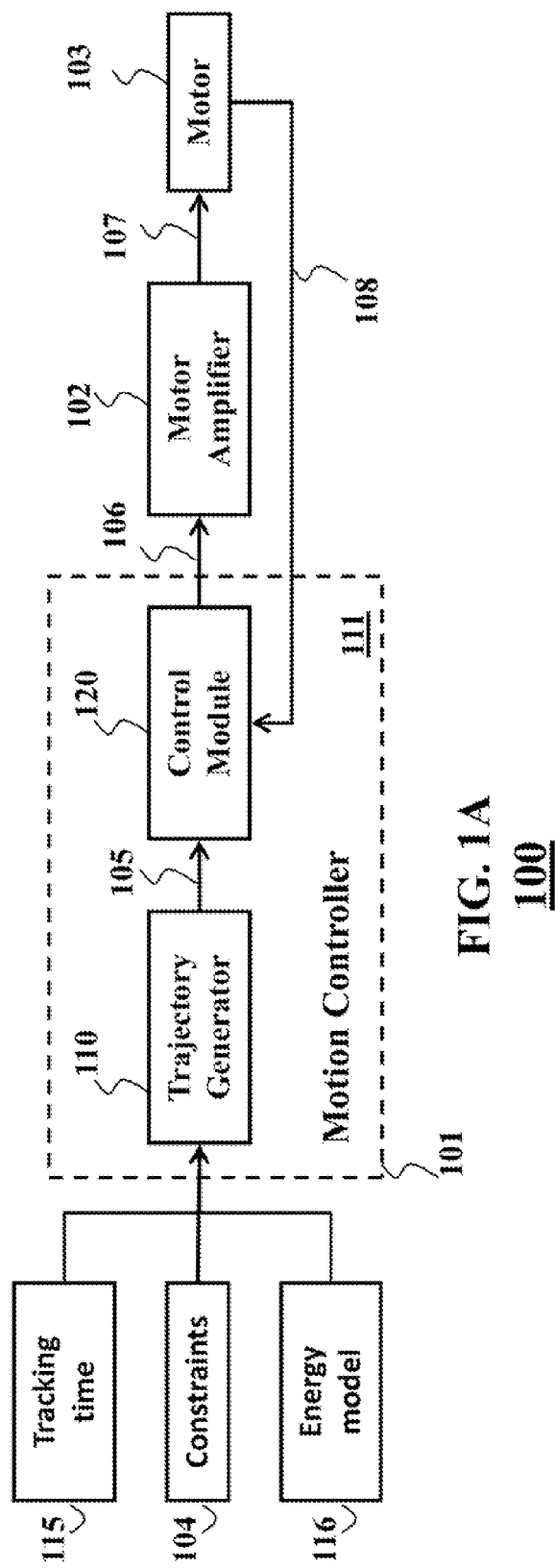
FIGS. 1A-1C are block diagrams of components of a motion control system according to some embodiments of an invention.
Figure 1B:
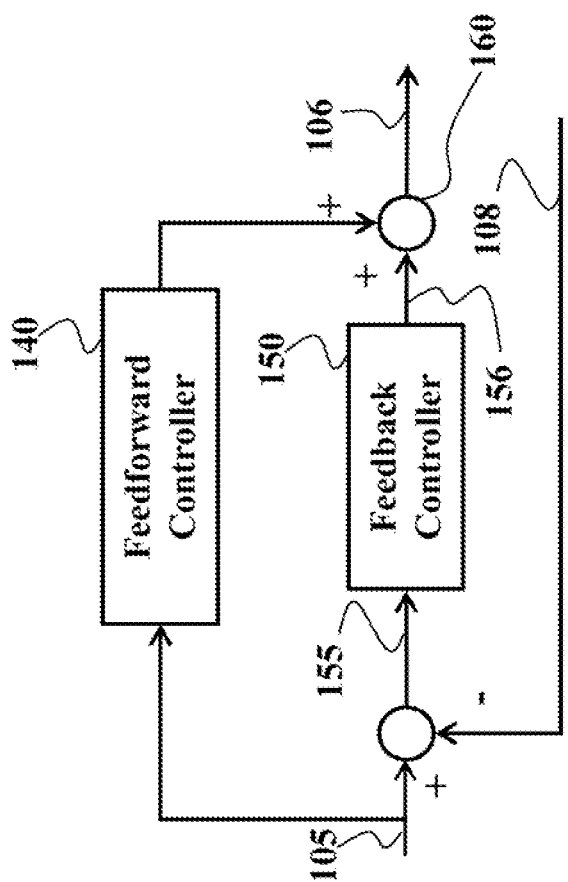
Figure 1C:
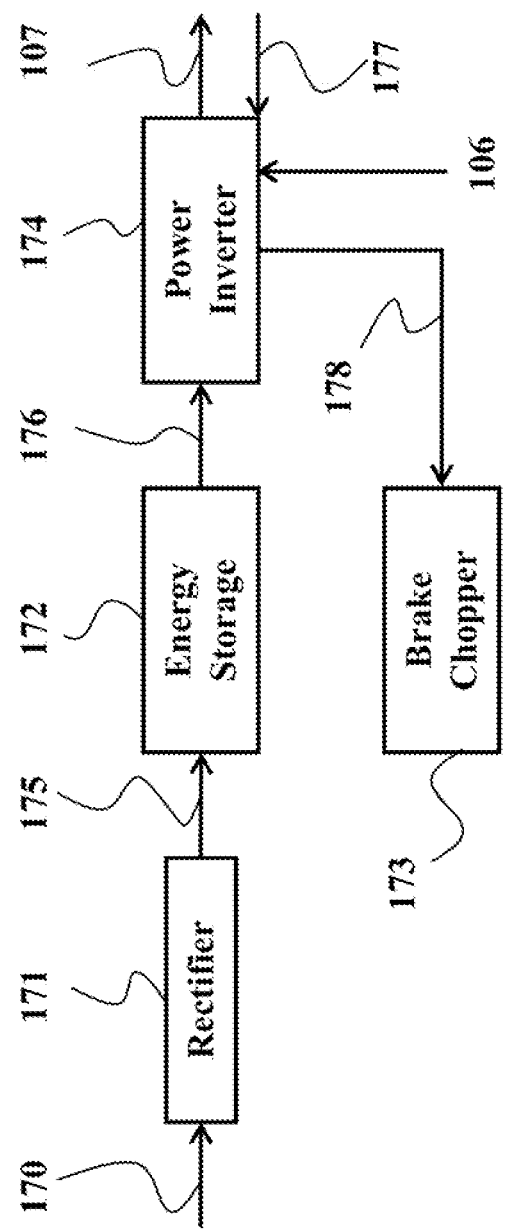

FIGS. 1A-1C shows block diagrams of a motion control system according to some embodiments of an invention. The motion control system can be configured to perform a single axis positioning task, or a multiple axes positioning tasks. An example of the motion control system is a servo system.

As shown in FIG. 1A, the energy efficient motion control system 100 includes one or combination of a motion controller 101, an amplifier 102, and a motor 103. The motion controller 101 can further include a trajectory generation module 110 and a control module 120. The trajectory generation module 110 receives constraints 104, tracking time 115, and energy model 116 as inputs and outputs an energy efficient trajectory 105 of a motion of the motor of the motion control system to the control module 120. The energy efficient trajectory can include one or combination of a control trajectory of a current input to the motor, a position trajectory of a position of the motor, a velocity trajectory of a velocity of the motor, and an acceleration trajectory of an acceleration of the motor. Typically, the control, the position, the velocity, and the acceleration trajectories are equivalent to each other, because, given the initial state of the motor, every trajectory uniquely determines the other three trajectories through the dynamics of the motor. As referred herein, the energy efficient trajectory is one or combination of abovementioned trajectories.

The trajectory generation module 110 determines the trajectory 105 by minimizing a cost function subject to the constraints 104. The cost function is determined based on an energy model 116 of the system 100 and a function of a tracking time 115, as described below. The motion controller can be implemented using a processor 111.

The control module 120 determines a control signal 106 based on the trajectory 105 and feedback signal 108, and outputs the control signal 106 to the amplifier 102 which determines and outputs a current or voltage input 107 to the motor 103. In one embodiment, the feedback signal 108 describes a current state of the motion control system. In another embodiment, the feedback signal 108 describes a motion of the motor 103. For example, in one variation of this embodiment, the feedback signal 108 is a position of the motor.

In some embodiments, the control module 120 performs feedforward and/or feedback operation to determine the control signal 106. FIG. 1B shows a block diagram of the control module 120 according to one embodiment of the invention. The control module 120 includes a feedforward controller 140 and a feedback controller 150. The feedforward controller takes the trajectory 105 as input, and a feedback controller takes an error signal 155 between the feedback signal 108 and the trajectory 105 to determine a correction signal 156. The control signal 106 is determined based on the trajectory 105 and the correction signal 156.

The embodiments shown in FIGS. 1A-1C are used for illustration purpose only, and are not intended to limit the scope of the invention. For example, in various embodiments, the command signal 105 or the control signal 106 are provided directly to the motor 103. In another embodiment, the control module is integrated into the amplifier 102, and the feedback signal 108 is fed into the amplifier.

FIG. 1C shows a block diagram of the amplifier according to one embodiment of the invention. A rectifier 171 rectifies a power supply 170 into DC current 175; which flows through an energy storage block 172. A power inverter 174 receives, from the energy storage block 172, the DC current 176 and generates AC current 107 to drive a motor. When a motor is decelerating, the motor generates energy and provides AC current 177 to the power inverter 174, which redirect the AC current 177 to a brake chopper 173. The brake chopper dissipates the power flow 178 from the power inverter 174. Signal 106 or 105 are used to control the power inverter such that it outputs the required current 107.

Energy Model of the Motion Control System

Figure 2A:
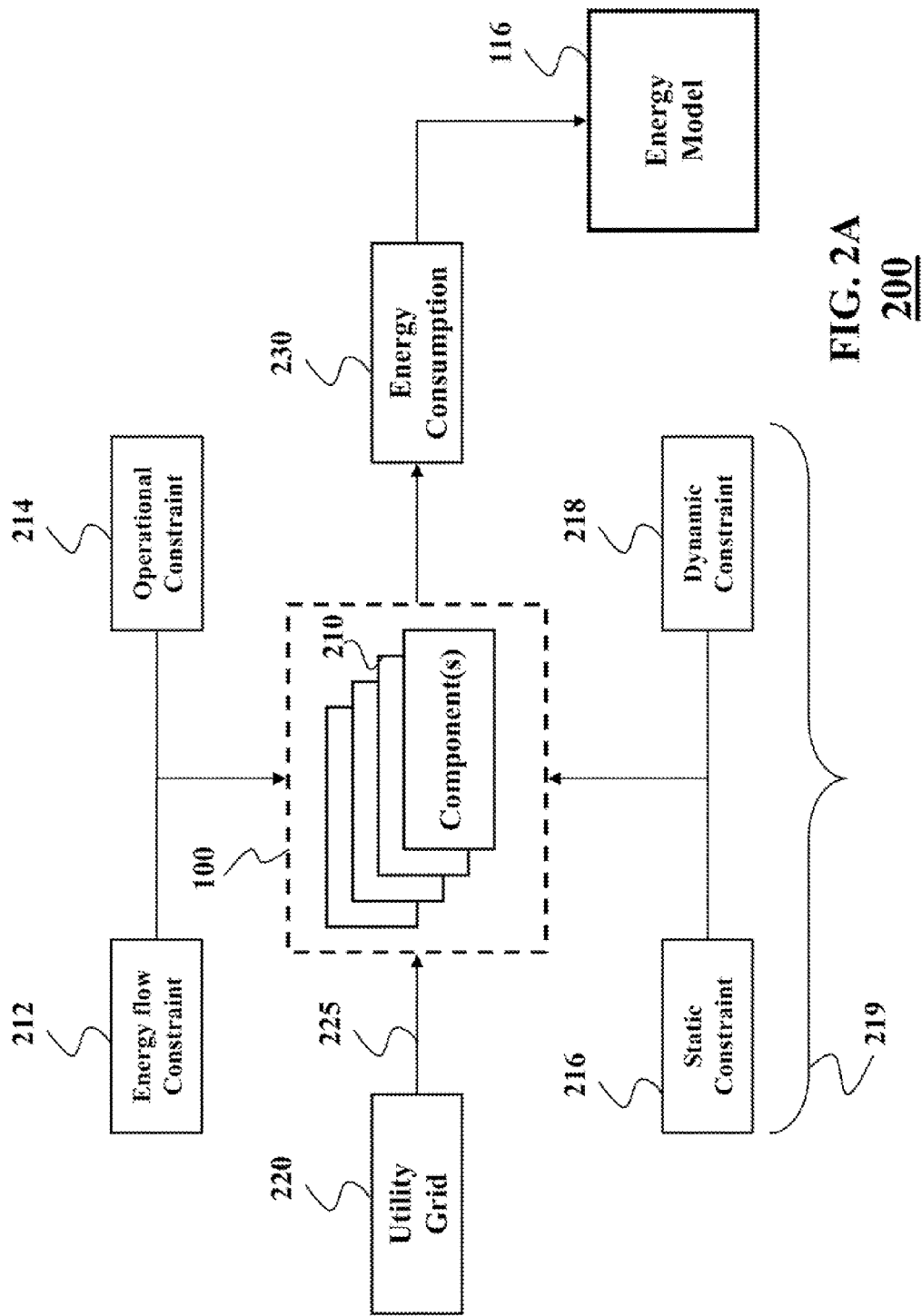
FIGS. 2A-2B are block diagrams of methods for generating and using an energy model and a cost function according to some embodiments of an invention.

FIG. 2A shows a block diagram of a method 200 for determining the energy model 116 of the motion control system in accordance with some embodiments of the invention. The energy model can be defined based on energy consumption 230 of components 210 of the system 100. The components 210 include, but are not limited to, the motor and the amplifier of the motion control system. The energy consumption 230 can be measured as an integral of the input energy 225 from utility grid 220. In various embodiments of the invention, the energy model of the Motion control system is based on static 216 and dynamic 218 constraints of the components for the system, constraint 214 on the operation of the system, and constraint 212 on energy flow during the operation of the system. Based on an accurate energy consumption model, the motion controller can generate a trajectory. Provided that the motion of a motor follows that trajectory, the energy consumption of a motion control system is effectively reduced.

For example, the dynamic constraint 218 includes consideration of dynamics of the motor of the motion control system. The dynamics of the motor can be defined according to $$\begin{bmatrix} \dot{x}_1 \\ \dot{x}_2 \end{bmatrix} = \begin{bmatrix} 0 & 1 \\ 0 & d \end{bmatrix} \begin{bmatrix} x_1 \\ x_2 \end{bmatrix} + \begin{bmatrix} 0 \\ b \end{bmatrix} u + \begin{bmatrix} 0 \\ c \end{bmatrix}$$

where $x=(x_1,x_2)=(\theta,\omega)$ is a state of the motor state representing a position of the motor position and an angular velocity respectively, u is the control input to the motor, d, c are the viscous and coulomb friction coefficients of the motor, respectively, h is a constant coefficient, a single dot indicates the first derivative, and double dots the second derivate, $x_2$ is a second component of the state of the motor x representing an angular velocity of the motor. The embodiment of the control input to the motor depends on the type of the motor. In one embodiment, the control input to the motor includes a current input into the motor. Additionally or alternatively the control input can include control signal of a voltage into the motor.

Generally, the gross energy consumption of a motion control system includes copper losses and iron losses, switching losses of an amplifier, and a mechanical work required for positioning the load. The mechanical work is influenced by the operational constraint 214. For example, the operational constraint 214 can include a size and/or a shape of a load, a distance of a relocation of the load, and other conditions of the operation of the motion control system.

The copper losses are due to the flow of current through the stator windings of the motor and can be defined according to $$Ru^2,$$

where R is the resistance of windings of the motor and is usually supplied by a manufacture of the motor. The iron losses are result from eddy currents and hysteresis, which can be approximated according to $$K_e\omega^2 u^2 + K_h|u|^\gamma \omega,$$

where $K_e$ and $K_h$ are constant coefficients of the eddy currents and the hysteresis losses of the motor, $\gamma$ is the Steinmetz constant. The Steinmetz constant as well as the hysteresis and eddy current constants can be determined, e.g., using curve fitting from the data provide by manufacturer of the motor.

The losses in the amplifier, e.g., a pulse-width-modulation amplifier, include switching losses, conduction losses, and gate drive losses. For example, the switching losses can be determined according to $$K_s|u|,$$

where $K_s$ is a constant coefficient of the switching loss.

The mechanical work can be modeled according to $$K_t\omega u,$$

where $K_t$ is the torque constant of the motor, and $\tau=K_t u$, and $\tau$ is the torque generated by the motor. The torque constant is usually supplied by the manufacture of the motor.

Hence, one embodiment of the invention describes the energy consumption 230 of the motion control system according to the following model 116

$$P(x,u)=Ru^2+\{K_e x_2^2 u^2+K_h|x_2||u^\gamma|\}+K_2|u|+K_t u x_2.$$

Moreover, for example, if iron losses and switching losses are relatively small, $K_e$, $K_h$ and $K_s$ may be zero. Therefore, in this case, the above model 116 can be replaced by the following equation.

$$P(x,u)=Ru^2+K_t u x_2.$$

Some embodiments of the invention consider the energy flow constraint 212 to determine the energy model 116. For example, when P(x,u)>0, the motion control system takes the energy from the utility grid. On the other hand, the mechanical work can be converted into energy by the motor and can flow back to the grid or be dissipated by the brake chopper. One embodiment uses the energy flow constraint requiring the brake chopper to dissipate the negative power P(x,u). Alternative embodiment uses the energy flow constraint requiring the energy to return from the motion control system back to the utility grid.

For example, in a more complex case, when the energy is not returned back to the grid, the energy model 116 is determined according to $$Q(x(t), u(t)) = \begin{cases} P(x(t), u(t)), & P(x(t), u(t)) > 0, \\ 0, & P(x(t), u(t)) \leq 0, \end{cases}$$

the establishment of an energy consumption model, which accurately captures the characteristics of the actual energy consumption of a motion control system is critical to implement an energy efficient motion control system.

Figure 2B:
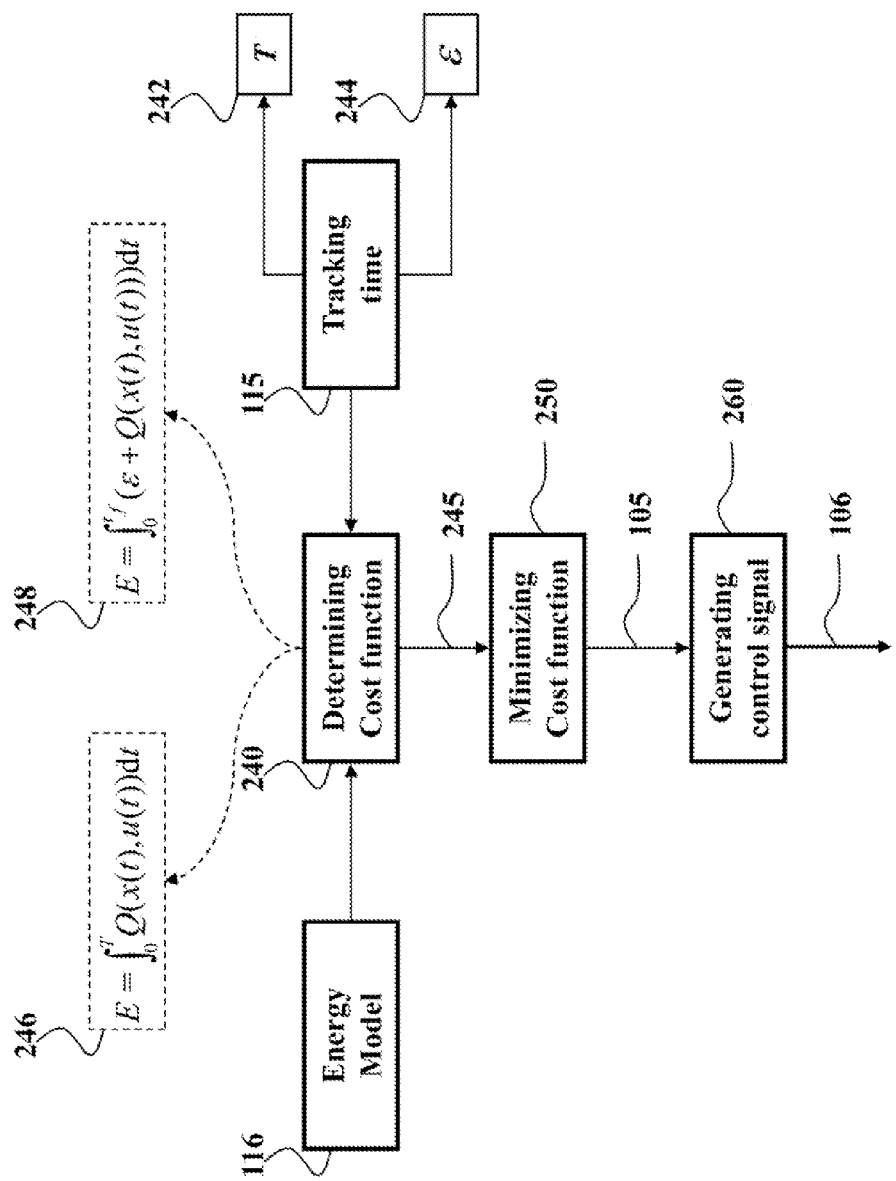

FIG. 2B shows a block diagram of a method for determining the control signal 106 according to some embodiment. The cost function 245 is determined 240 based on the energy model 116 and based on a function 115 of the tracking time.

In one embodiment the function of the tracking time is a tracking time T 242 at which the load has to be position into a desired position. For example, the tracking time can be provided by the user of the motion control system. The cost function 245 for the energy consumed by the motion control system over the tracking period T can include an integral 246 of the gross energy consumption according to $$E = \int_0^T Q(x(t), u(t)) dt. \quad (1)$$

In some embodiments, the energy model is modified according to variation in implementations of the motion control system. For example, the energy consumption of a small scale motion control system can be approximated based on only the resistive loss. In this embodiment, the energy model can be represented as a quadratic function of control.

After the energy model and the cost function are defined, the embodiments minimize 250 the cost function 245 to determine the energy-efficient trajectory 105. Consequently, the trajectory generated by minimizing a cost function can obtain a good energy efficient motion control system. In some embodiments, when the cost function and the constraints exactly depict the properties of a motion control system, an energy optimal motion control system is resulted. The cost function can be used to make the trade off between energy consumption and tracking time. For example, in one embodiment, the cost function is defined by Equation (1). Thus, the trade off between energy consumption and tracking time is achieved by varying the tracking time T, which can be specified by a user through a user interface.

In alternative embodiment, the function 115 of tracking time is represented a trade off between the tracking time and the energy consumption. For example, the cost function is determine as an integral 246 according to $$E = \int_0^{t_f} (\epsilon + Q(x(t), u(t))) dt,$$

where the tracking time $t_f$ is unspecified, and $\epsilon$ 244 is a preference constant, which can be introduced by a user. A large value of the preference constant $\epsilon$ reflects the importance of the tracking time of the operation of the motion control system, i.e., productivity of the system, over the energy efficiency. A small value of the preference constant $\epsilon$ means the opposite, i.e., reflects importance of the energy efficiency over the tracking time.

The current disclosure describes the embodiments based on the cost function according to Equation (1). Its extension to different cost functions is straightforward to those skilled in the art.

Some embodiments of the invention consider physical limitation of a design of the motion control system. Typical motion control system is subject to a number of constraints, such as static 216 and dynamic 218 constraints. The static constraint 216 includes an acceleration constraint, a velocity constraint, and an input current constraint of the motor. The dynamic constraint 218 represents dynamics of the motor. In the rest of this disclosure, the constraints 219 include at least some of the static and the dynamic constraints, the tracking time, and an initial and a final state of the motor. The consideration of constraints in the trajectory generation can remove the limitations introduced by the ignorance of constraints in the design stage, thus improves the energy efficiency of a motion control system.

Hamiltonian Control Optimization

Figure 3:
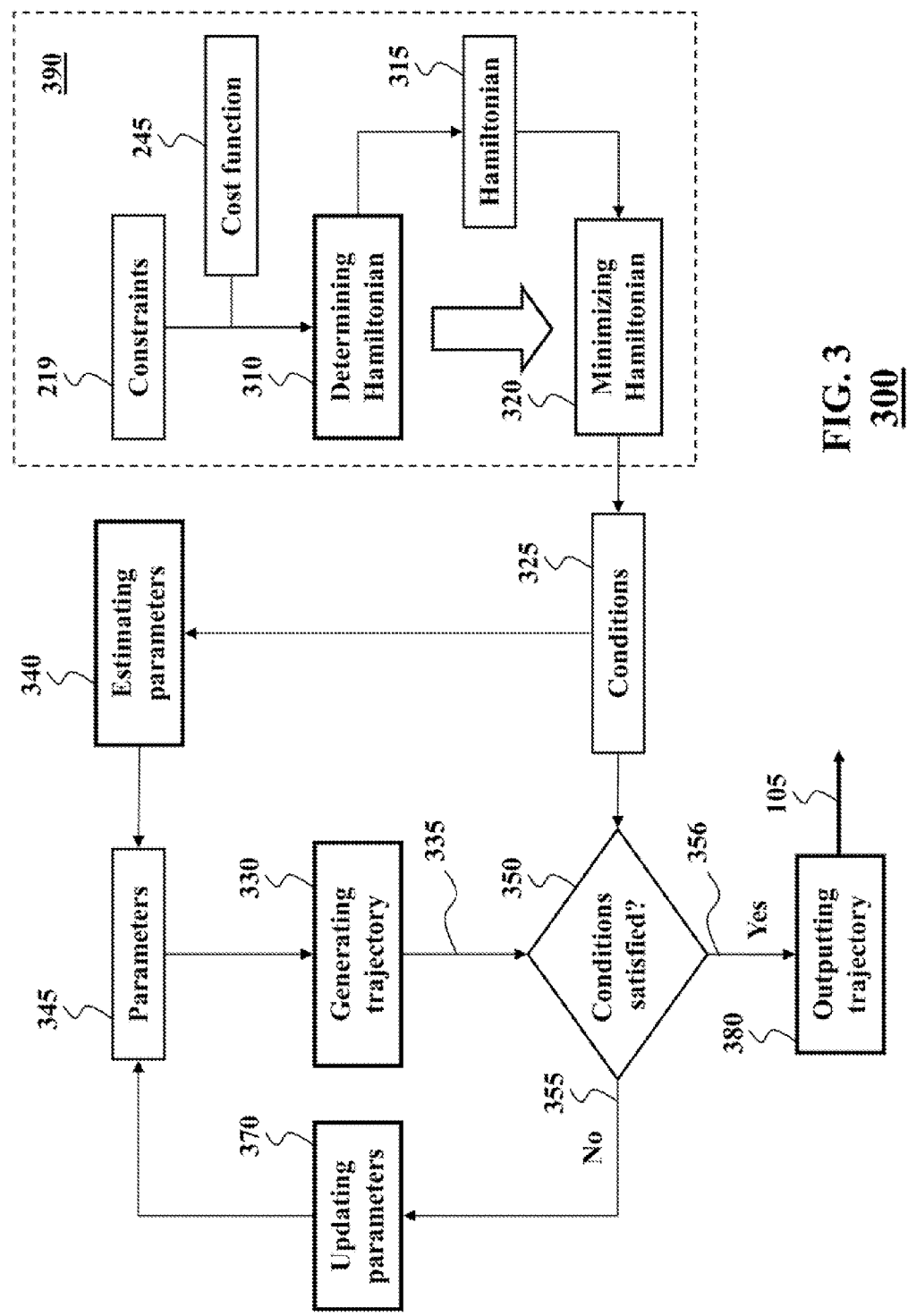
FIG. 3 is a block diagram of a method for generating an energy efficient trajectory according to some embodiments of an invention.

FIG. 3 shows a block diagram of a method 300 for determining the energy efficient trajectory 105 according to some embodiments of the invention. The embodiments use Hamiltonian based control optimization 390, wherein necessary conditions 325 for solving the optimal control problem minimize a Hamiltonian 315, which implies the minimization of a cost function. Therefore an energy efficient trajectory of a motion control system can be obtained by solving a trajectory satisfying conditions 325.

Accordingly, some embodiments determine 310, based on the cost function 245 and the constraints 219, the Hamiltonian 315 and determine 320 a set of conditions 325 that minimizes the Hamiltonian 315. A preliminary trajectory 335 is generated 330 based on parameters 345. Initially, according to one embodiment, the parameters 345 are guessed or estimated 340 based on the conditions 325.

The preliminary trajectory 335 is generated iteratively until 350 the conditions 325 are satisfied. When the preliminary trajectory 335 satisfies 356 the conditions, the preliminary trajectory is outputted 380 as the trajectory 105, because such trajectory is guaranteed to minimize the energy consumption without violating constraints. Otherwise 355, the parameters are updated 370 based on the preliminary trajectory 335, and subsequent preliminary trajectory is generated 330.

Some embodiments perform a gradient based search of the trajectory 105. Additionally or alternatively, some embodiments solve a resultant multi-point boundary value problem which is formulated from the set of conditions, as described in more details below. The parameters 345 can include, but are not limited to, one or combination of state and costate trajectories, entry time of each segment of the trajectory, switch times for each segment of the trajectory, and lagrange multiplier $\pi$.

Some embodiments of the invention use the cost function is a piecewise function of Equation (1). Accordingly, in those embodiments, the corresponding Hamiltonian is defined piecewisely over, e.g., the control input u.

Figure 4:
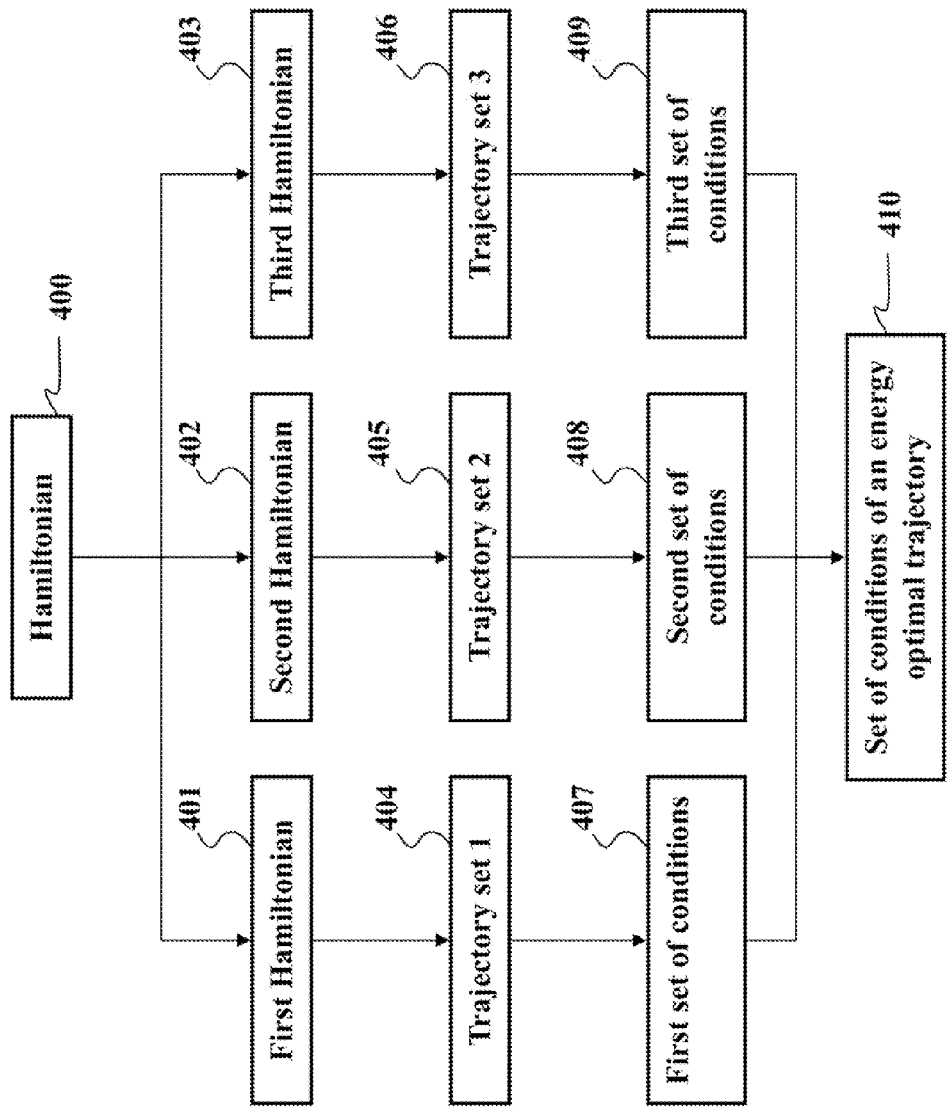
FIG. 4 is a block diagram of switching among types of the trajectories corresponding to a cost function according an embodiment of the invention.

FIG. 4 shows a diagram of a piecewise expression of a Hamiltonian 400 according to some embodiments. A first Hamiltonian 401 is defined for positive control input to the motor and positive energy consumption of the motion control system. A second Hamiltonian 402 is defined for negative control input to the motor and positive energy consumption of the motion control system. A third Hamiltonian 403 is defined for non-positive control input to the motor and non-positive energy consumption of the motion control system. The definition of Hamiltonians 401, 402, 403 is used to derive a set of conditions 325 in explicit form.

Accordingly, the trajectory 105 is also partitioned into three set of sub-trajectories. A first set of sub-trajectories 404 corresponds to the first Hamiltonian 401. A second set of sub-trajectories 405 corresponds to the second Hamiltonian 402. A third set of sub-trajectories 406 corresponds to the third Hamiltonian 403.

Similarly, the set of conditions also determine for each Hamiltonian. Specifically, a first set of conditions 407 corresponds to the first Hamiltonian 401. A second set of conditions 408 corresponds to the first Hamiltonian 402. A third set of conditions 409 corresponds to the first Hamiltonian 403. The first, the second, and the third set of conditions, or their combinations, form the set of conditions 410 that the trajectory 105 has to satisfy.

To determine each set of conditions, the corresponding Hamiltonian has to be explicitly defined. For example, the Hamiltonian 401 includes terms of the energy model, and the products of static and dynamic constraints, and their corresponding Lagrange multipliers. Some embodiments first convert all state constraints to mixed state control constraints, and then define the Hamiltonian based on the mixed state control constraints. For example, the velocity constraint is a state constraint because the velocity constraint does not include control variable. Thus, the velocity constraint is converted into a mixed state control constraint according to $$x_2 - v_{max} \leq 0 \Rightarrow dx_2 + c + bu \leq 0,$$

$$-x_2 \leq 0 \Rightarrow -dx_2 - c - bu \leq 0,$$

where $v_{max}$ is the maximum velocity, and d, c, b, $v_{max}$ are constant. Similarly, the acceleration constraint is converted to a mixed state control constraint according to $$dx_2+c+bu-a_{max} \leq 0$$

$$-a_{max}-dx-c-bu \leq 0,$$

where $a_{max}$ is constant and defines the maximum acceleration.

Accordingly, one embodiment defines the Hamiltonian 401 according to $$H_{11} = \{Ru^2 + K_e x_2^2 u^2 + K_h x_2 u^\gamma + K_s u + K_f x_2 u\} + \overline{H}_1,$$

wherein $$\overline{H}_1 = \lambda^T (Ax + Bu + C) + \mu^T \begin{bmatrix} dx_2 + c + bu \\ -dx_2 - c - bu \end{bmatrix} + v^T \begin{bmatrix} dx_2 + c + bu - a_{max} \\ -a_{max} - dx_2 - c - bu \end{bmatrix},$$

where $\lambda = (\lambda_1, \lambda_2)$, $\mu = (\mu_1, \mu_2)$, $v = (v_1, v_2)$ are Lagrange multipliers corresponding to the dynamic, velocity and acceleration constraints respectively.

The Hamiltonian 402 is defined according to $$H_{12} = \{Ru^2 + K_e x_2^2 u^2 + K_h x_2 (-u)^\gamma - K_s u + K_f x_2 u\} + \overline{H}_1.$$

The Hamiltonian 403 is defined according to $$H_2 = \lambda^T (Ax + Bu + C) + v_2(-a_{max} - dx_2 - c - bu)$$

However, the definition of the Hamiltonian varies across the embodiments. For example, some embodiments include a state constraint in the Hamiltonian. Alternative embodiments include a control constraint in the Hamiltonian. Other variations of the Hamiltonian are within the scope of the invention.

After the Hamiltonians are defined, each set of conditions, i.e., the first, the second, and the third set of conditions, is determined for the corresponding Hamiltonian. For example, the first set of conditions 407 is determined for the first Hamiltonian 401 and each sub-trajectory in the first set of sub-trajectories 404 has to satisfy the first set of conditions 407 in order to optimize the energy consumption of the motion control system.

In one embodiment, the first set of conditions for the first Hamiltonian $H_{11}$ is defined as follows.

First Condition:
dynamics of the state and costate defined according to $$\dot{x} = f(x, u),$$

$$\dot{\lambda}^T = -\frac{\partial H_{11}}{\partial x}.$$

The first equation is the dynamic constraint or equivalently the dynamics of a motor.

Second Condition:
Control input u satisfies $$u = \begin{cases} \min_{u>0} H_{11}, & \text{no constraint active,} \\ \dfrac{a_{max} - dx_2 - c}{b}, & \text{positive acceleration constraint active,} \\ -\dfrac{dx_2 + c}{b}, & \text{velocity constraint active.} \end{cases}$$

Third Condition:
If the maximum velocity constraint becomes active at a point of tracking time $t_2$.

$$x_2(t_2) - v_{max} = 0,$$

$$\lambda(t_2^+) = \lambda(t_2^-) - \pi \begin{bmatrix} 0 \\ 1 \end{bmatrix}.$$

where $\pi$ is the Lagrange multiplier.

Fourth Condition:
Conditions of Lagrange multipliers $\mu$, $v$ satisfy $$\frac{\partial H_{11}}{\partial u} = 0,$$

$$\mu \begin{cases} = 0, & \text{velocity constraint inactive,} \\ \geq 0, & \text{velocity constraint active,} \end{cases}$$

$$v \begin{cases} = 0, & \text{acceleration constraint inactive,} \\ \geq 0, & \text{acceleration constraint active.} \end{cases}$$

Fifth Condition:
Boundary conditions are dependent on the structures of a trajectory. Assuming a sub-trajectory corresponding to the first Hamiltonian is defined over the interval $t \in [0, t_3] t_1 \leq t_2 < t_3$, and maximum acceleration constraint and velocity constraint are active orderly, the boundary conditions of the sub-trajectory are $$x(0) = x_0,$$

$$x(t_1^+) = x(t_1^-), x(t_2^+) = x(t_2^-),$$

$$\lambda(t_1^+) = \lambda(t_1^-), \lambda(t_2^+) = \lambda(t_2^-) - \begin{bmatrix} 0 \\ \pi \end{bmatrix},$$

$$x_2(t_2) = v_{max},$$

$$u(t_1^+) = u(t_1^-),$$

$$u(t_2^+) = u(t_2^-),$$

where $t_1$ is the point of the tracking time when acceleration constraint becomes inactive, and $t_2$ is the time when velocity constraint becomes active.

The first set of conditions is used to define the first set of sub-trajectories where the optimal control input is positive. The first set of sub-trajectories can potentially include various segments where either no constraint is active, or the maximum acceleration constraint is active, or the maximum velocity constraint is active. Each segment corresponds to conditions, which takes the form of smooth nonlinear ordinary differential equations (ODE) and nonlinear algebraic equations (NAE). The ODEs describe the dynamics of the motor state and the corresponding costate, and the NAEs define the optimal control input as a function of state x(t) and costate $\lambda(t)$, terminal conditions of the ODEs or segments, and conditions to determine the entry time of each segment.

All segments of the sub-trajectory are combined by the terminal conditions of each segment or ODEs. At the entry point of a segment, where the maximum acceleration constraint is active over the $k^{th}$ segment, the terminal conditions are the continuity of state and costate are $$x(t_k^+) = x(t_k^-)$$

$$\lambda(t_k^+) = \lambda(t_k^-)$$

where $t_k$ is the entry time of the $k^{th}$ segment. At the entry point of the segment where the maximum velocity constraint is active over the $k^{th}$ segment, the terminal conditions are the continuity of state and the jump condition of the costate, are $$x(t_k^+) = x(t_k^-)$$

$$\lambda(t_k^+) = \lambda(t_k^-) - \begin{bmatrix} 0 \\ \pi \end{bmatrix}.$$

There are conditions to determine the entry time of each segment. Due to the convexity of the first Hamiltonian and the admissible control domain, an optimal control which minimizes the first Hamiltonian is uniquely defined. Thus conditions on the entry time of each segment is the continuity of control input according to $$u(t_k^+) = u(t_k^-).$$

The Lagrange multiplier $\pi$ is defined by $x_2(t_k) = v_{max}$. Finally the number of ODEs and unknowns is equal to that of terminal conditions, entry conditions, jump condition, and initial or final state conditions. Thus, the first set of conditions is complete.

The second 408 and the third 409 set of conditions are similarly determined. However, to combine all three sets of conditions, terminal conditions of each sub-trajectory are required. The terminal conditions can be determined by applying the variation of calculus technique, and take the form of the continuity of the state and costate at the terminal points. Similarly, the conditions on the entry time of each sub-trajectory are derived as the continuity of control.

Thus, the set of conditions 410 that the entire optimal trajectory 105 has to satisfy includes conditions piecewisely defined over corresponding the first 404, the second 405 and the third 406 set of sub-trajectories, combined with the terminal and entry conditions of each set of sub-trajectories.

The set of conditions includes ODEs which define the dynamics of state $x(t)$ and costate $\lambda(t)$ of the motor, and NAEs which define the Lagrange multiplier $\pi$, Lagrange multipliers $\mu$, $\nu$ as functions of the state $x$, the costate $\lambda$ and the control input $u$, an unconstrained optimal control input as a function of state $x$ and costate $\lambda$ of the motor, a constrained optimal control input as a function of state $x$, the terminal conditions of each segment, the terminal conditions of each sub-trajectory, the conditions on the entry time of each segment, conditions on the entry time of each sub-trajectory, and the initial and the final state of the optimal trajectory. All these conditions forms the set of conditions 410 which can be summarized according to $$\dot{x} = Ax + Bu_k(x, \lambda) + C, t \in [t_{k-1}, t_k], 1 \le k \le m,$$

$$\dot{\lambda} = -\left(\frac{\partial H}{\partial x}\right)^T,$$

$$g(x(t_k^-), x(t_k^+), \lambda(t_k^-), \lambda(t_k^+), \pi) = 0,$$

$$h(x_0, x_f) = 0.$$

where $t_k$ is the entry time of the $k^{th}$ segment of the energy-optimal trajectory, $t_0 = 0$, $t_m = T$, m is the number of segments, g,h are nonlinear functions corresponding to the NAEs, and the $x_0$, $x_f$ are the initial and final states of the trajectory. Thus the conditions are formulated as a multi-point boundary value problem, having boundary conditions g=0, h=0 included in the nonlinear algebraic equations.

Figure 5:
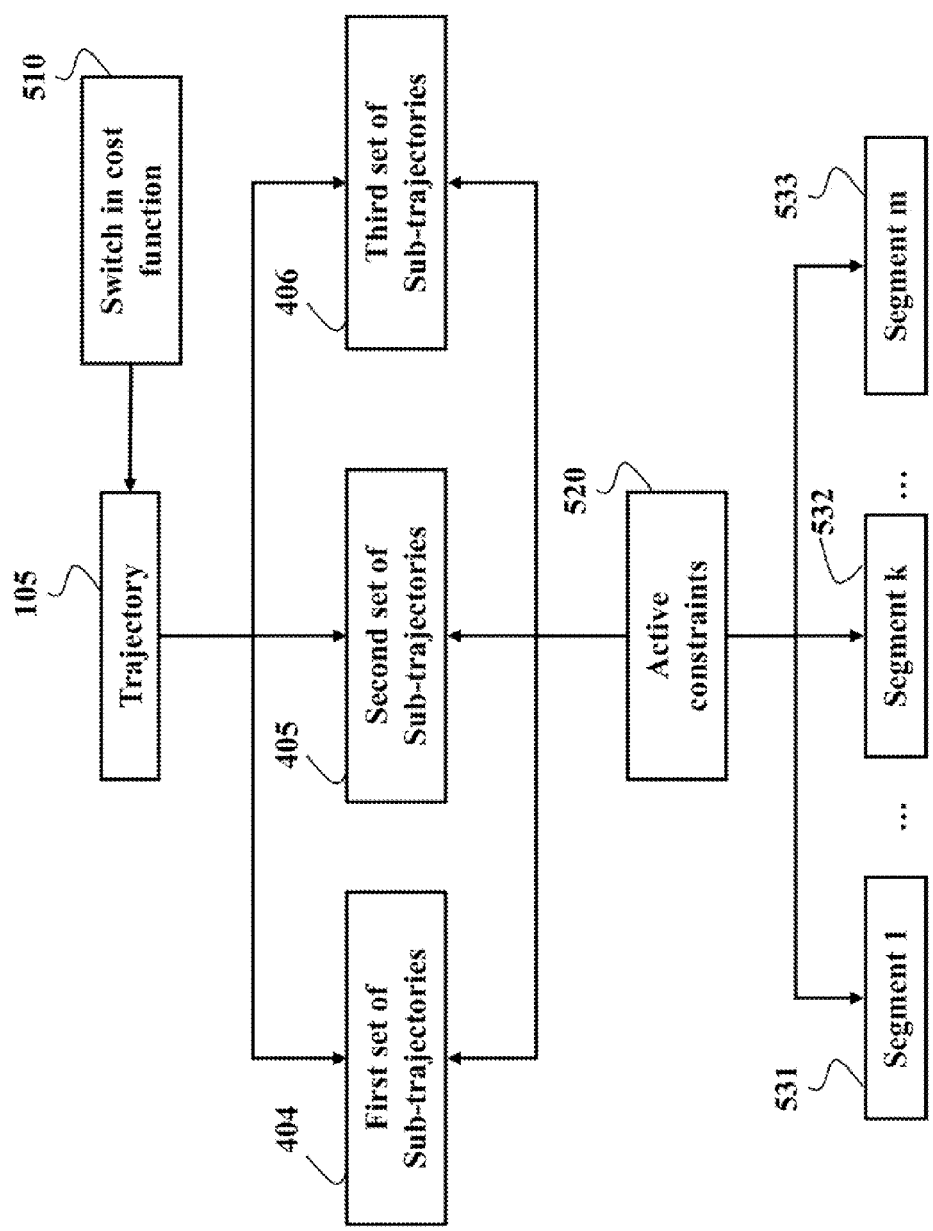
FIG. 5 is a block diagram of a hierarchical structure of the energy efficient trajectory according to some embodiments of the invention.

Some embodiments of the invention determine a structure of the trajectory 105, as shown in FIG. 5 and FIG. 6. Due to a switch 510 in the cost function, the trajectory 105 usually includes three sets of sub-trajectories 404, 405, and 406, as described above. Each sub-trajectory can further include segments 531-533 in dependence of the currently active constraints 520.

Typically, each sub-trajectory includes at least one segment if no constraint is active or at least two segments if any constraint is active. The trajectory 105 is piecewisely continuous, and includes segments over which the trajectory is smooth. Some embodiments of the invention identify types of segments, referred herein as arcs, which the trajectory can include. Specifically, according to one embodiment, the trajectory can include, but is not limited to, one or combination of an unconstrained positive control arc ($U^+$), an unconstrained negative control and positive power arc ($U^-$), a positive acceleration constrained arc ($A^+$) a negative acceleration constrained and positive power arc ($A^-$), a maximum velocity constraint arc ($V^+$), a zero control and zero power arc ($U_P^U$), an unconstrained negative control and zero power arc ($U_P^-$), a negative acceleration and negative power arc ($A_P^-$).

The energy-optimal control input $u(t)$ over each arc is $$u = \begin{cases} \min_{u>0} H_{11}, & \text{over } U^+, \\ \min_{u<0} H_{12}, & \text{over } U^-, \\ \frac{a_{max} - dx_2 - c}{b}, & \text{over } A^+, \\ \frac{-a_{max} - dx_2 - c}{b}, & \text{over } A^-, \\ -\frac{dx_2 + c}{b}, & \text{over } V^+, \\ 0, & \text{over } U_P^0, \\ \min_{P(x,u)=0, u<0} H_{12}, & \text{over } U_P^-, \\ \frac{-a_{max} - dx_2 - c}{b}, & \text{over } A_P^-. \end{cases} \quad (2)$$

It can be shown that the Hamiltonians $H_{11}$, $H_{12}$, $H_2$ and the energy consumption $P(x,u)$ are convex functions of the control input u, thus the energy optimal control can be uniquely solved.

Due to the nonlinearity of the energy consumption $P(x,u)$, the analytical forms of the energy-optimal control is difficult to obtained. Approximation solutions of Equation (2) can be obtained by numerical computation or by simplifying $P(x,u)$ to obtain closed-form solutions. As an example, treating $\gamma=1$ yields an energy-efficient control as follows $$u = \begin{cases} -\dfrac{(\gamma K_h + K_t)x_2 + K_s + b\lambda_2}{2(R + K_e x_2^2)}, & \text{over } U^+, \\ -\dfrac{(K_t - \gamma K_h)x_2 - K_s + b\lambda_2}{2(R + K_e x_2^2)}, & \text{over } U^-, \\ \dfrac{a_{max} - dx_2 - c}{b}, & \text{over } A^+, \\ \dfrac{-a_{max} - dx_2 - c}{b}, & \text{over } A^-, \\ -\dfrac{dx_2 + c}{b}, & \text{over } V^+, \\ 0, & \text{over } U_P^0, \\ \dfrac{(K_h - K_t)x_2 + K_s}{R + K_e x_2^2}, & \text{over } U_P^-, \\ \dfrac{-a_{max} - dx_2 - c}{b}, & \text{over } A_P^-. \end{cases}$$

Further approximation can be taken to reduce the computation load to generate an energy-efficient control trajectory. For instance, an energy-efficient trajectory can be generated by minimizing the following cost functional $$E = \int_0^T P(x(t), u(t)) dt.$$

The structure of the trajectory describes the order of arcs. A general structure, which is the case an energy-optimal control trajectory includes all types of arcs, is shown in FIGS. 6A-6B. FIG. 6A shows the acceleration trajectory a(t) of the motor over the tracking time t. FIG. 6B shows the trajectory as a function of the control input u(t) of the motor over the tracking time t.

The general structure of the energy-optimal control trajectory includes nine arcs, and begins with a positive acceleration constrained arc $^{AB}$ 510 or 510', followed by an unconstrained positive control arc $^{BC}$ 515 or 515', a velocity constrained arc $^{CD}$ 520 or 520', an unconstrained positive control arc $^{DE}$ 525 or 525', a zero control and negative power arc $^{EF}$ 530 or 530', a negative acceleration and negative power arc $^{GH}$ 540 or 540', a negative control and zero power arc $^{HI}$ 545 or 545', an unconstrained negative control and positive power arc $^{IJ}$ 550 or 550', a negative acceleration and positive power arc $^{JK}$ 555 or 555'. Other structures are can be similarly determined for those skilled in the art.

Some embodiments of the invention define piecewise ODEs and NAEs based on the set of conditions 410. The combination of the ODEs and the NAEs well-defines a multi-point boundary value problem (MBVP) that can be solved iteratively as shown in FIG. 3. Various embodiments use different method to solve the MBVP. For example, one embodiment solves the MBVP using multiple shooting.

The multiple shooting generally requires the knowledge of the structure of the energy efficient control trajectory. In one embodiment, the parameters 345 include state and costate trajectories, the entry time of each segment, and Lagrange multiplier π. In alternative embodiment, the parameters 345 include the terminal states and costates of each segment, the time of switch, and the Lagrange multiplier π. Given the parameters, the state and costate trajectories are generated by integrating the piecewise ODEs. Also, the gradient of boundary conditions with respect to the parameters is determined by integrating sensitivity equations.

As an example, the sensitivity equation describing the variations of the final state of the motor with respect to variations of the initial costate trajectory, and Lagrange multiplier is $$\frac{d}{dt} \frac{\partial x(t, t_0, x_0, \lambda_0, t_k, \pi)}{\partial \lambda_0} = (f_x + f_u u_x) \frac{\partial x}{\partial \lambda_0} + f_u u_\lambda \frac{\partial \lambda}{\partial \lambda_0}, \quad \frac{\partial x(t_0)}{\partial \lambda_0} = 0$$

$$\frac{d}{dt} \frac{\partial x(t)}{\partial \pi} =$$

$$\begin{cases} 0, & \text{before velocity constraint becomes active} \\ f_x \dfrac{\partial x}{\partial \pi} + f_u \left( u_x \dfrac{\partial x}{\partial \pi} + u_\lambda \dfrac{\partial \lambda}{\partial \pi} \right), & \text{otherwise} \end{cases},$$

$$\frac{\partial x(t_0)}{\partial \pi} = 0$$

where $$f_x = \frac{\partial f(x, u(x, \lambda))}{\partial x}, \quad f_u = \frac{\partial f(x, u(x, \lambda))}{\partial u},$$

$$u_x = \frac{\partial u(x, \lambda)}{\partial x}, \quad u_\lambda = \frac{\partial u(x, \lambda)}{\partial \lambda}.$$

If the boundary conditions are satisfied, then the generated state trajectory is optimal, otherwise, the computed gradient is used to update 370 the parameters.

Figure 7:
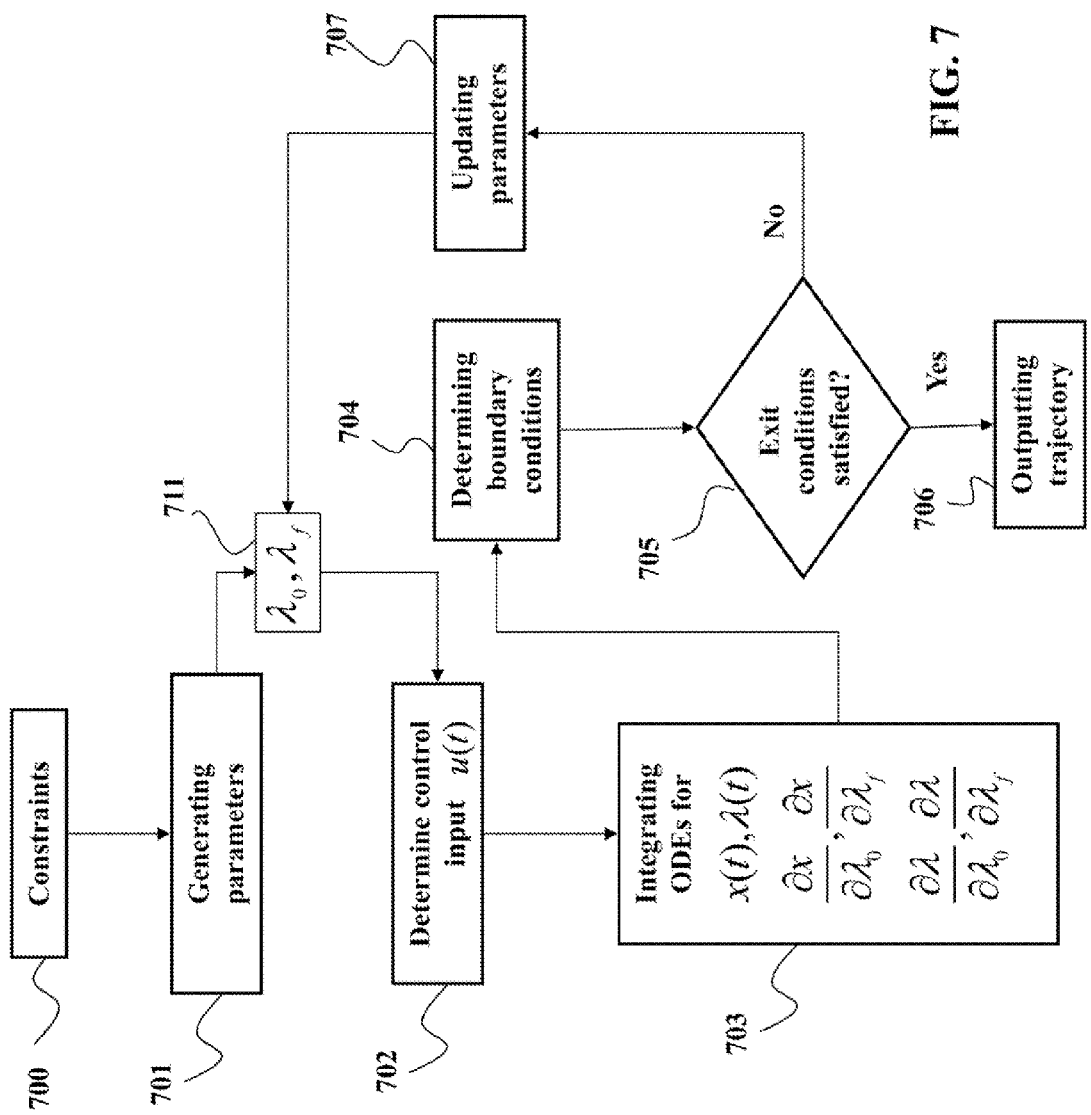
FIG. 7 is a flowchart of a method for generating trajectory according to some embodiments of the invention.

Some embodiments recognize that the structure of the trajectory is difficult to determine. To circumvent the determination of structure, one embodiment uses a shooting method which generates the trajectory by solving the MBVP as a two-point boundary value problem. In this embodiment the parameters 345 includes an initial value of costate $\lambda_0$, and/or a final value of costate $\lambda_f$. The trajectory generator is designed to search for corresponding values of the costate $\lambda_0^*, \lambda_f^*$ from which an energy-efficient trajectory can be generated. FIG. 7 shows a block diagram of a method for generating trajectory according this embodiment of the invention.

Figure 8:
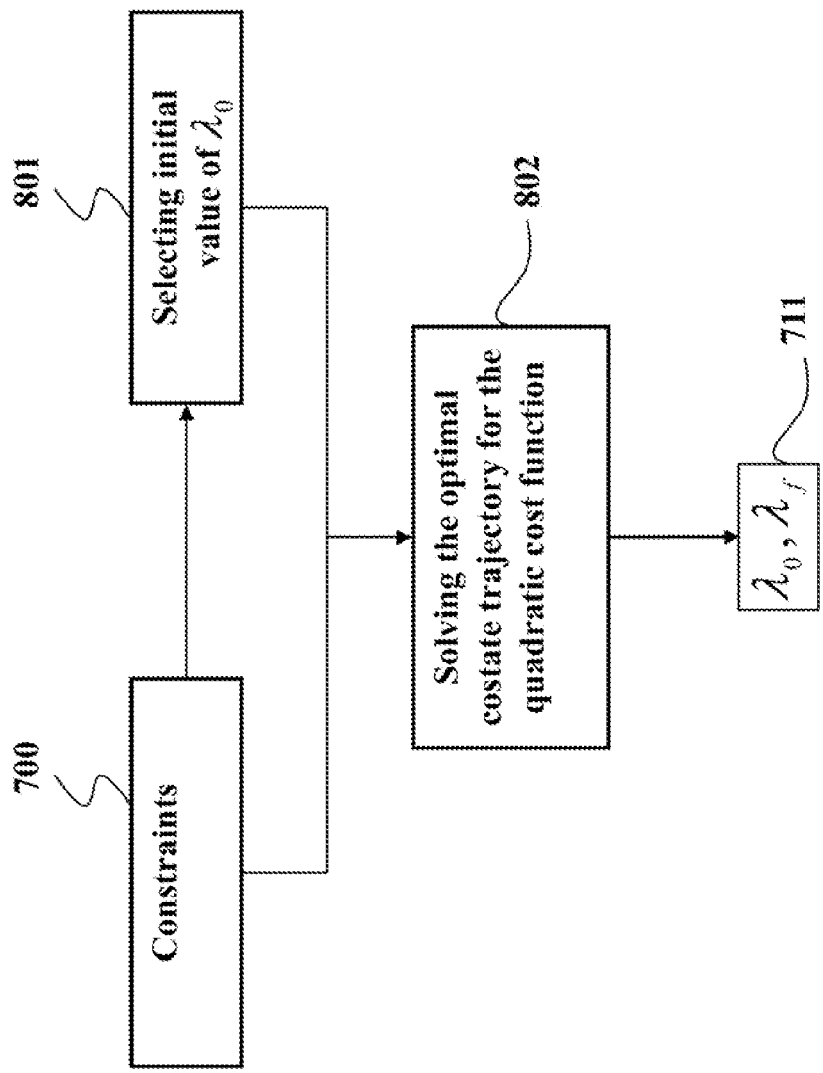
FIG. 8 is a flowchart of a method for generating the initial guess in the method shown of FIG. 7 according to some embodiments of the invention.

In the embodiment, the constraints 700 include initial and final states of the motor, and the tracking time. The constraints are the input to the trajectory generator. Initial values of the parameters $\lambda_0, \lambda_f$ 711 are generated 701 based on the set of conditions which the energy-optimal trajectory has to satisfy. For example, according to the conditions derived) from Hamiltonian, $\lambda(t_0)$ has to be less than zero, $\lambda_1(t_f) = \lambda_1(t_0)$, and $\lambda_2(t_f)$ has to be non-negative. FIG. 8 shows an alternative embodiment for generating the initial parameters. Given the constraints 700 and initial value of $\lambda_0 < 0$, 801, the optimal trajectory minimizing the quadratic cost function $E = \int_0^T Ru^2 dt$ is solved 802 using, e.g., a single shooting method. The initial and final values of the resultant costate trajectory are used as the initial values of the parameters 711.

Referring back to FIG. 7, based on parameter $\lambda_0$ and the initial state $x_0$, the control input is uniquely determined 702 from NAEs. Next, the trajectories of state x(t) and costate λ(t) are determined by integrating 703 ODEs established from Hamiltonians forward from the initial state. Similarly, based on the parameter $\lambda_f$ and the final state $x_f$, trajectories of state and costate, i.e., $\bar{x}(t), \bar{\lambda}(t)$, respectively, are determined by integrating 703 the same ODES backward from the final state. Gradient of the state and the costate trajectories with respect to the parameters $\lambda_0, \lambda_f$ are determined by integrating sensitivity equations.

The residue and the gradient of boundary conditions are determined 704 with respect to previously determined parameters $\lambda_0, \lambda_f$ and the exit conditions are evaluated 705. For example, if the residue and/or the gradient meet a tolerance of error, the energy-efficient trajectory is outputted 706. In one embodiment, if the residue and/or the gradient do not meet the tolerance, but the iteration limit is reached, the current trajectory or a time-optimal trajectory is outputted and failure flag is set. If exit conditions are not met, both the residue and gradient of boundary conditions are used to update 707 the parameters 711 and the steps of the methods are repeated.

Direct Search Over Preliminary Trajectories

Figure 9:
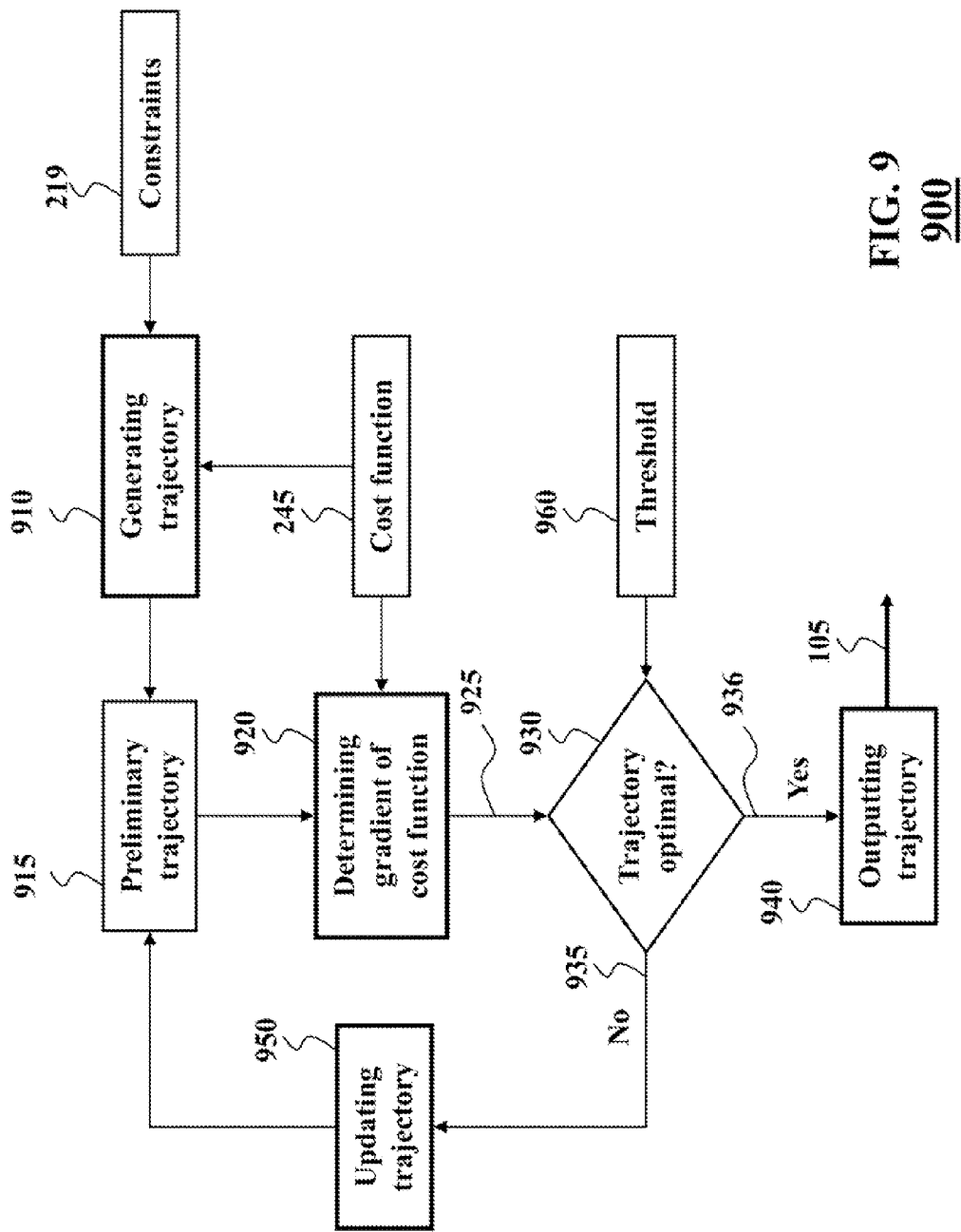
FIG. 9 is a flowchart of a method for determining the trajectory using gradients, according to one embodiment.

FIG. 9 shows a block diagram of a method for determining the trajectory 105 by directly searching over possible preliminary trajectories that minimizes the energy consumption, according to some embodiments of the invention. Preliminary trajectories can be one or more of the control, the state and the costate trajectories. The method determines 910 the preliminary trajectory 915, e.g., the state and/or the costate trajectories, and determines 920 a gradient 925 of the cost function 245 with respect to the preliminary trajectory.

If the gradient is less 936 than a threshold 960, the trajectory 915 is outputted as the energy optimal trajectory 105. Otherwise 935, the preliminary trajectory is updated 950, and the gradient is determined again for the new preliminary trajectory. These steps of the method are repeated iteratively until the optimal trajectory is determined 930 or the maximum number of iterations is reached. In one embodiment, the threshold 960 equals zero.

In fact, the embodiments solve the following infinite dimensional optimization problem $$\min_{x(t),u(t)} \int_0^T Q(x(t), u(t))\,dt$$

subject to the constraints 219, which can include the dynamic and the static constraints, the initial and the final state conditions, and the tracking time.

Figure 10:
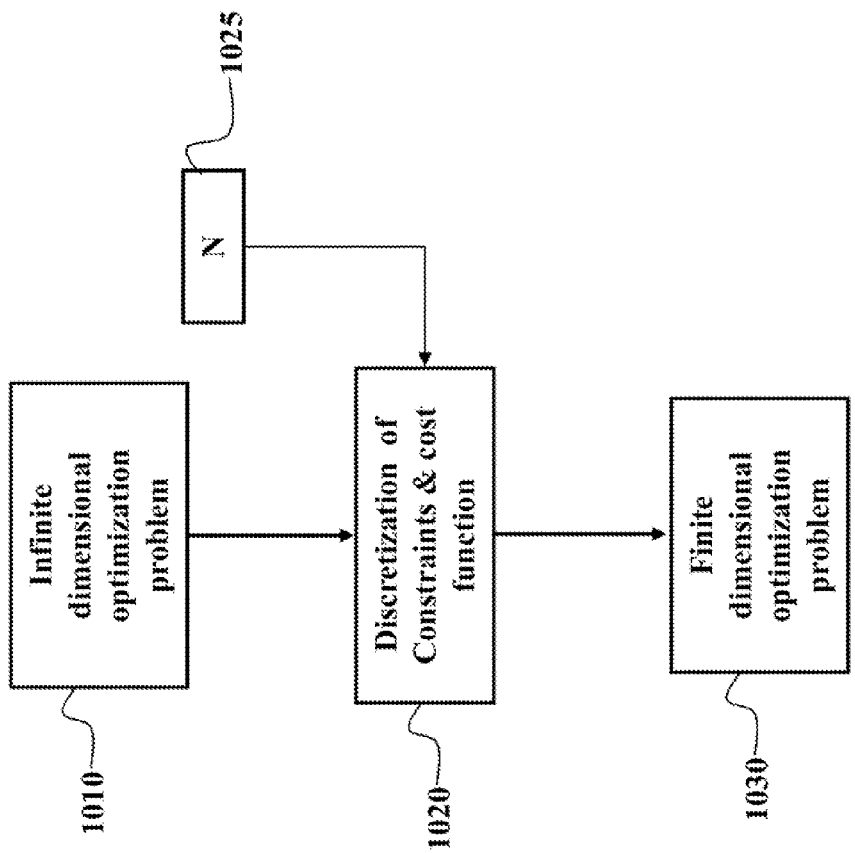
FIG. 10 is a block diagram of a method for transforming an infinite dimensional optimization according to some embodiments of the invention.

FIG. 10 shows a method according another embodiment of the invention, which convert the infinite dimensional optimization problem 1010 to a finite dimensional nonlinear optimization problem 1030 by discretizing 1020 the decision variables x(t),u(t), the dynamic and the static constraints over time A (number N 1025 indicates a number of discretization of tracking time.

The discretization 1020 can be performed by a number of methods. For example, one embodiment partitions the tracking time [0,T] into N equally distributed subintervals:

$$0=t_0<t_1<\ldots<t_N=T.$$

Given the sample time $\delta T=T/N$, the control, state, and the dynamics of the motor are discretized as follows $$u: u(0), \ldots, u(N-1),$$

$$x: x(0), \ldots, x(N),$$

$$A_d = e^{AT},\ B_d = \int_0^T e^{(T-\tau)}B\,d\tau,\ C_d = \int_0^T e^{A(T-\tau)}C\,d\tau,$$

$$x(k+1) = A_d x(k) + B_d u(k) + C_d(k).$$

The resultant nonlinear optimization problem is formulated as follows $$\min_{u(0),\ldots,u(N-1),x(0),\ldots,x(N-1)} \sum_{k=1}^N Q(x(k), u(k))\delta T$$

subject to $$x(k+1) = A_d \bar{x}(k) + B_d u(k) + C_d(k),$$

$$|u(k)| \le u_{max}$$

$$0 \le x_2(k) \le v_{max}$$

$$-a_{max} \le \frac{x_2(k+1) - x_2(k)}{\delta T} \le a_{max}$$

$$x(0) = (0, 0),\ x(N) = (x_f, 0)$$

$$\bar{x}(k+1) - x(k+1) = 0.$$

The generation of preliminary state and control trajectories for the finite dimensional optimization problem can be achieved by a number of different methods. For example, by solving the energy optimal trajectory for the quadratic cost function case, wherein the cost function is the integral of the energy consumption P(x(t),u(t)).

Because the cost function is convex, and the constraint is linear, the global minimum is guaranteed and, thus, the preliminary trajectory for the quadratic cost function problem can be selected arbitrarily. Given the preliminary trajectory, e.g., the state and/or the control trajectories, various nonlinear programming solvers are available to solve the aforementioned finite dimensional optimization problem.

One alternative embodiment uses the state and costate trajectories as decision variables, and solves the optimization problem $$\min_{x(t),\lambda(t)} \int_0^T Q(x(t), u(t))\,dt$$

subject to the constrains, i.e., the static and the dynamic constraints, the terminal conditions, the entry conditions of each segment and the sub-trajectory formulated as the NAEs. Gradient of the cost function with respect to state and costate trajectories are computed by the sensitivity equations.

Discretizing the cost function, the constraints, and the sensitivity equations produces a finite dimensional optimization problem. The gradient is obtained from the discretized sensitivity equations. One embodiment uses Newton's method to iteratively update the state and costate trajectories.

Effect of the Invention

Embodiments of the invention makes an effective trade off between the energy consumption and tracking time of an operation of the motion control system and provide an energy efficient motion control system and a method for generating energy efficient trajectory of a motion of a motor of the motion control system. Some embodiments provide such trade off that considers various constraints of the motion control system including velocity, acceleration, and current constraints.

The embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium or multiple computer readable media, e.g., a computer memory or compact discs (CD), optical discs, digital video disks (DVD). Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating a control signal for controlling an operation of a motion control system suitable for positioning a load, comprising the steps of:
   determining a cost function based on a model of energy consumption of the system and a function of a tracking time, determining the model according to $$P(x,u) = Ru^2 + K_t u x_2,$$

wherein $P(x, u)$ is the energy consumption of the system, x is a state of the motor, u is a control input to the motor, R is a resistance of windings of the motor, $x_2$ is a second component of the state of the motor x representing an angular velocity of the motor, and $K_t$ is a torque constant of the motor;
   minimizing the cost function subject to constraints to determine a trajectory of the control signal; and
   generating the control signal based on the trajectory and a current state of the system, wherein the steps of the method are performed by a processor.

2. The method of claim 1, further comprising:
   determining the model based on the energy consumption of components of the system.

3. The method of claim 1, further comprising:
   determining the model based on at least one of a copper loss at a motor of the system, an iron loss at the motor of the system, a switching loss of an amplifier of the system, and a mechanical work required for positioning the load, or combination thereof.

4. The method of claim 1, further comprising:
   determining the model according to $$P(x,u) = Ru^2 + \{K_e x_2^2 u^2 + K_h |x_2||u^\gamma|\} + K_s |u| + K_t u x_2,$$

wherein $P(x, u)$ is the energy consumption of the system, x is a state of the motor, u is a control input to the motor, R is a resistance of windings of the motor, $x_2$ is a second component of the state of the motor x representing an angular velocity of the motor, $K_e$ is a constant coefficient of an eddy current of the motor, $K_h$ is a constant coefficient of hysteresis losses in the motor, $K_s$ is a constant coefficient of the switching loss at an amplifier, $\gamma$ is the Steinmetz constant, and $K_t$ is a torque constant of the motor.

5. The method of claim 4, further comprising:
   determining the model according to $$Q(x(t), u(t)) = \begin{cases} P(x(t), u(t)), & P(x, u) > 0, \\ 0, & P(x, u) \leq 0, \end{cases}$$

wherein is time.

6. The method of claim 5, further comprising:
   determining the cost function according to $$E = \int_0^T Q(x(t), u(t)) dt$$

wherein T is the tracking time.

7. The method of claim 5, further comprising:
   determining the cost function according to $$E = \int_0^{t_f} (\epsilon + Q(x(t), u(t))) dt,$$

wherein $t_f$ is an unspecified tracking time, and $\epsilon$ is a preference constant.

8. The method of claim 1, wherein the constraints includes one or combination of an acceleration constraint of a motor, a velocity constraint of the motor, an input current constraint of the motor, a dynamic constraint of the motor, the tracking time, an initial state of the motor, and a final state of the motor.

9. The method of claim 1, further comprising:
   determining a Hamiltonian based on the cost function and the constraints;
   determining a set of conditions minimizing the Hamiltonian; and
   determining the trajectory that satisfies the set of conditions.

10. The method of claim 9, further comprising:
    formulating a resultant multi-point boundary value problem based on the set of conditions; and
    solving the problem to produce the trajectory.

11. The method of claim 9, wherein the minimizing comprises:
    defining a Hamiltonian based on the cost function and the constraints, wherein the Hamiltonian includes a first Hamiltonian for a positive control signal and a positive energy consumption, a second Hamiltonian for a negative control signal and the positive energy consumption, and a third Hamiltonian for the negative control signal and the negative energy consumption;
    determining a first set of conditions for a first sub-trajectory, such that the first Hamiltonian is minimized;

determining a second set of conditions for a second sub-trajectory, such that the second Hamiltonian is minimized;

determining a third set of conditions for a third sub-trajectory, such that the third Hamiltonian is minimized; and determining the set of conditions based on the first, the second, and the third set of conditions.

12. The method of claim 11, further comprising:

determining nonlinear algebraic equations (NAE) satisfying the set of conditions, such that the NAE defines the control signal at a current point of the tracking time;

determining boundary conditions, wherein the boundary conditions include terminal conditions, and entry conditions for each of the first, the second, and the third sub-trajectory;

determining nonlinear ordinary differential equations (ODE) satisfying the boundary conditions, such that the ODE defines a state and a costate of the system at the current point of the tracking time; and solving the ODE and the NAE alternately over the tracking time until the boundary conditions are satisfied to produce the trajectory.

13. The method of claim 12, wherein the NAE includes linear algebraic equations.

14. The method of claim 1, further comprising:

determining a preliminary trajectory; and selecting the preliminary trajectory as the trajectory, if a gradient of the cost function with respect to the preliminary trajectory is less than a threshold.

15. The method of claim 14, further comprising:

determining a finite dimensional optimization problem that minimizes the cost function subject to the constraint; and determining the trajectory by solving the problem.

16. The method of claim 15, further comprising:

performing a discretization of decision variables, the cost function, and the constraints;

approximating an infinite dimensional optimization problem with the finite dimensional optimization problem;

generating a preliminary trajectory;

determining a gradient of the cost function with respect to the preliminary trajectory;

determining the trajectory based on the preliminary trajectory, if the gradient is less than a threshold; and otherwise;

updating the preliminary trajectory based on the gradient and the constraints; and repeating the determining the gradient and the determining the trajectory.

* * * * *